(12) United States Patent
Byers et al.

(10) Patent No.: US 10,451,499 B2
(45) Date of Patent: *Oct. 22, 2019

(54) METHODS FOR APPLYING PASSIVE STRAIN INDICATORS TO COMPONENTS

(71) Applicant: General Electric Company, Schenectady, NY (US)

(72) Inventors: Jason Anton Byers, Greenville, SC (US); Bryan J. Germann, Greenville, SC (US); Daniel Warren Miller, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 212 days.

This patent is subject to a terminal disclaimer.

(21) Appl. No.: 15/480,577

(22) Filed: Apr. 6, 2017

(65) Prior Publication Data
US 2018/0292275 A1 Oct. 11, 2018

(51) Int. Cl.
*G01L 1/24* (2006.01)
*F01D 25/00* (2006.01)
(Continued)

(52) U.S. Cl.
CPC .............. *G01L 1/247* (2013.01); *F01D 17/04* (2013.01); *F01D 21/003* (2013.01); *F01D 25/00* (2013.01);
(Continued)

(58) Field of Classification Search
CPC ..... G01L 5/0061; F01D 17/04; F01D 21/003; F01D 25/00; F05D 2230/60; F05D 2240/30; F05D 2260/80; F05D 2270/80
See application file for complete search history.

(56) References Cited

U.S. PATENT DOCUMENTS

| 4,528,856 A | 7/1985 | Junker et al. |
| 4,746,858 A | 5/1988 | Metala et al. |

(Continued)

FOREIGN PATENT DOCUMENTS

WO   WO 2014/931957   2/2014

OTHER PUBLICATIONS

Qian et al., Identifying Regional Cardiac Abnormalities From Myocardial Strains Using Nontracking-Based Strain Estimation and Spatio-Temporal Tensor Analysis, 2011, IEEE, p. 2017-2029 (Year: 2011).*

(Continued)

*Primary Examiner* — McDieunel Marc
(74) *Attorney, Agent, or Firm* — Dority & Manning, P.A.

(57) ABSTRACT

A computer-implemented method for applying passive strain indicators to a component includes creating a plurality of surface curves and a plurality of data points on each of the plurality of surface curves, the plurality of surface curves and the plurality of data points defining the exterior surface of the component. The method further includes receiving data indicative of a user input selection of a selected surface curve of the plurality of surface curves, a selected data point of the plurality of data points on the selected surface curve, and a selected rotation angle. The method further includes determining an output dimension, location, and orientation of a passive strain indicator. The method further includes providing one or more control signals to a passive strain indicator application system to cause the system to apply the passive strain indicator having the output dimension, location, and orientation to the component.

18 Claims, 6 Drawing Sheets

(51) Int. Cl.
  *F01D 17/04* (2006.01)
  *F01D 21/00* (2006.01)
  *G01M 5/00* (2006.01)
  *G01B 11/16* (2006.01)

(52) U.S. Cl.
  CPC ....... *G01M 5/0016* (2013.01); *F05D 2230/60* (2013.01); *F05D 2240/30* (2013.01); *F05D 2260/80* (2013.01); *F05D 2270/80* (2013.01); *G01B 11/16* (2013.01)

(56) References Cited

U.S. PATENT DOCUMENTS

| | | |
|---|---|---|
| 4,782,705 A | 11/1988 | Hoffmann et al. |
| 4,859,062 A | 8/1989 | Thurn et al. |
| 6,078,396 A | 6/2000 | Manzouri |
| 6,175,644 B1 | 1/2001 | Scola et al. |
| 6,574,363 B1 | 6/2003 | Classen et al. |
| 6,983,659 B2 | 1/2006 | Soechting et al. |
| 6,986,287 B1 | 1/2006 | Dorfman |
| 7,200,259 B1 | 4/2007 | Gold et al. |
| 7,227,648 B2 | 6/2007 | Weinhold |
| 7,414,732 B2 | 8/2008 | Maidhof et al. |
| 7,421,370 B2 | 9/2008 | Jain et al. |
| 7,441,464 B2 | 10/2008 | Turnbull et al. |
| 7,477,995 B2 | 1/2009 | Hovis et al. |
| 7,490,522 B2 | 2/2009 | Ruehrig et al. |
| 7,533,818 B2 | 5/2009 | Hovis et al. |
| 7,689,003 B2 | 3/2010 | Shannon et al. |
| 7,697,966 B2 | 4/2010 | Monfre et al. |
| 7,849,752 B2 | 12/2010 | Gregory et al. |
| 8,245,578 B2 | 8/2012 | Ranson et al. |
| 8,307,715 B2 | 11/2012 | Ranson |
| 8,511,182 B2 | 8/2013 | Bjerge et al. |
| 8,600,147 B2 | 12/2013 | Iliopoulos et al. |
| 8,818,078 B2 | 8/2014 | Telfer et al. |
| 8,994,845 B2 | 3/2015 | Mankowski |
| 9,128,063 B2 | 9/2015 | Dooley |
| 9,200,889 B2 | 12/2015 | Swiergiel et al. |
| 9,207,154 B2 | 12/2015 | Harding et al. |
| 9,311,566 B2 | 4/2016 | Iliopoulos et al. |
| 9,316,571 B2 | 4/2016 | Müller et al. |
| 9,879,981 B1 * | 1/2018 | Dehghan Niri ..... G01M 5/0041 |
| 2013/0013224 A1 | 6/2013 | Ito et al. |
| 2013/0194567 A1 | 8/2013 | Wan et al. |
| 2014/0000380 A1 | 1/2014 | Slowik et al. |
| 2014/0267677 A1 | 9/2014 | Ward, Jr. et al. |
| 2015/0239043 A1 | 8/2015 | Shipper, Jr. et al. |
| 2016/0161242 A1 | 6/2016 | Cook et al. |
| 2016/0313114 A1 | 10/2016 | Tohme et al. |
| 2016/0354174 A1 | 12/2016 | Demir |
| 2017/0167859 A1 * | 6/2017 | Burnside ............. G01B 11/165 |
| 2017/0358073 A1 * | 12/2017 | Yuksel ................. G06T 7/0008 |
| 2018/0172434 A1 * | 6/2018 | Burnside ............. G01M 5/0016 |
| 2018/0252515 A1 * | 9/2018 | Germann ............. G01B 11/16 |
| 2018/0292274 A1 * | 10/2018 | Byers ................... F01D 21/003 |

OTHER PUBLICATIONS

Fung Kee Fung et al., Angle-independent strain mapping in myocardial elastography 2D strain tensor characterization and principal component imaging, 2005, IEEE, p. 516-519 (Year: 2005).*

* cited by examiner

METHODS FOR APPLYING PASSIVE STRAIN INDICATORS TO COMPONENTS

FIELD

The present disclosure relates generally to methods for applying passive strain indicators to components.

BACKGROUND

Throughout various industrial applications, apparatus components are subjected to numerous extreme conditions (e.g., high temperatures, high pressures, large stress loads, etc.). Over time, an apparatus's individual components may suffer deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress a working fluid (e.g., air) as the working fluid flows through the compressor section. The compressor section supplies a high pressure compressed working fluid to the combustors where the high pressure working fluid is mixed with a fuel and burned in a combustion chamber to generate combustion gases having a high temperature and pressure. The combustion gases flow along a hot gas path into the turbine section. The turbine section utilizes the combustion gases by extracting energy therefrom to produce work. For example, expansion of the combustion gases in the turbine section may rotate a shaft to power the compressor, an electrical generator, and other various loads.

During operation of a turbomachine, various components within the turbomachine, and particularly components along the hot gas path such as turbine blades within the turbine section of the turbomachine, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a computer-implemented method for applying passive strain indicators to a component is provided. The component includes an exterior surface. The method includes creating, by one or more computing devices, a plurality of surface curves and a plurality of data points on each of the plurality of surface curves, the plurality of surface curves and the plurality of data points defining the exterior surface of the component. The method further includes receiving, by the one or more computing devices, data indicative of a user input selection of a selected surface curve of the plurality of surface curves, a selected data point of the plurality of data points on the selected surface curve, and a selected rotation angle. The method further includes determining, by the one or more computing devices and in response to the selected surface curve, selected data point, and selected rotation angle, an output dimension, location, and orientation of a passive strain indicator. The method further includes providing, by the one or more computing devices, one or more control signals to a passive strain indicator application system to cause the system to apply the passive strain indicator having the output dimension, location, and orientation to the component.

In accordance with another embodiment of the present disclosure, a computer-implemented method for applying passive strain indicators to a component is provided. The component includes an exterior surface. The method includes performing, by one or more computing devices, a stress analysis of the component, wherein the stress analysis provides a life-limiting location on the exterior surface. The method further includes creating, by the one or more computing devices, a plurality of surface curves and a plurality of data points on each of the plurality of surface curves, the plurality of surface curves and the plurality of data points defining the exterior surface of the component. The method further includes receiving, by the one or more computing devices, data indicative of a user input selection of a selected surface curve of the plurality of surface curves, a selected data point of the plurality of data points on the selected surface curve, and a selected rotation angle. The method further includes determining, by the one or more computing devices and in response to the selected surface curve, selected data point, and selected rotation angle, an output dimension, location, and orientation of a passive strain indicator. The passive strain indicator is located within the life-limiting location. The method further includes providing, by the one or more computing devices, one or more control signals to a passive strain indicator application system to cause the system to apply the passive strain indicator having the output dimension, location, and orientation to the component.

In accordance with another embodiment of the present disclosure, a computer-implemented method for applying passive strain indicators to a component is provided. The component includes an exterior surface. The method includes obtaining, by one or more computing devices, an output dimension, location, and orientation of each of a plurality of passive strain indicators for the component. The method further includes determining, by the one or more computing devices, an inverse rotation matrix for each of the plurality of passive strain indicators based on the orientation and location of each of the plurality of passive strain indicators. The method further includes determining, by the one or more computing devices, a movement profile for each of the plurality of passive strain indicators based on the inverse rotation matrix. The method further includes providing, by the one or more computing devices, one or more control signals to a passive strain indicator application system to cause the system to apply each of the plurality of passive strain indicators to the component based on the movement profile for each of the plurality of passive strain indicators.

In accordance with another embodiment of the present disclosure, a computer-implemented method for applying passive strain indicators to a component is provided. The component includes an exterior surface. The method includes obtaining, by one or more computing devices, an output dimension, location, and orientation of each of a plurality of passive strain indicators for the component. The method further includes receiving, by the one or more computing devices, data indicative of a selected coordinate system for the component, the selected coordinate system for the component corresponding to a predetermined coordinate system for a passive strain indicator application system. The method further includes determining, by the one or more computing devices, an inverse rotation matrix for each of the plurality of passive strain indicators based on the orientation and location of each of the plurality of passive strain indicators and on the selected coordinate system. The method further includes determining, by the one or more computing devices, an application order for the plurality of passive strain indicators, wherein the application order is based on one or more predetermined component parameters. The method further includes determining, by the one or more computing devices, a movement profile for each of the plurality of passive strain indicators based on the inverse rotation matrix. The method further includes providing, by the one or more computing devices, one or more control signals to the passive strain indicator application system to cause the system to apply each of the plurality of passive strain indicators to the component based on the movement profile for each of the plurality of passive strain indicators.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to systems and methods for applying passive strain indicators to components, such as in some embodiments turbine components. The systems and methods as described herein may provide a number of technical effects and benefits, and may further provide improvements in the strain sensing technology. For example, systems and methods in accordance with the present disclosure may advantageously reduce the amount of time required to determine where to place strain sensing apparatus on components and to precisely place such strain sensing apparatus. Systems and methods in accordance with the present disclosure further reduce or eliminate the potential for errors when applying strain sensing apparatus in particular locations on a component, such as in locations having complex shapes.

Figure 5:
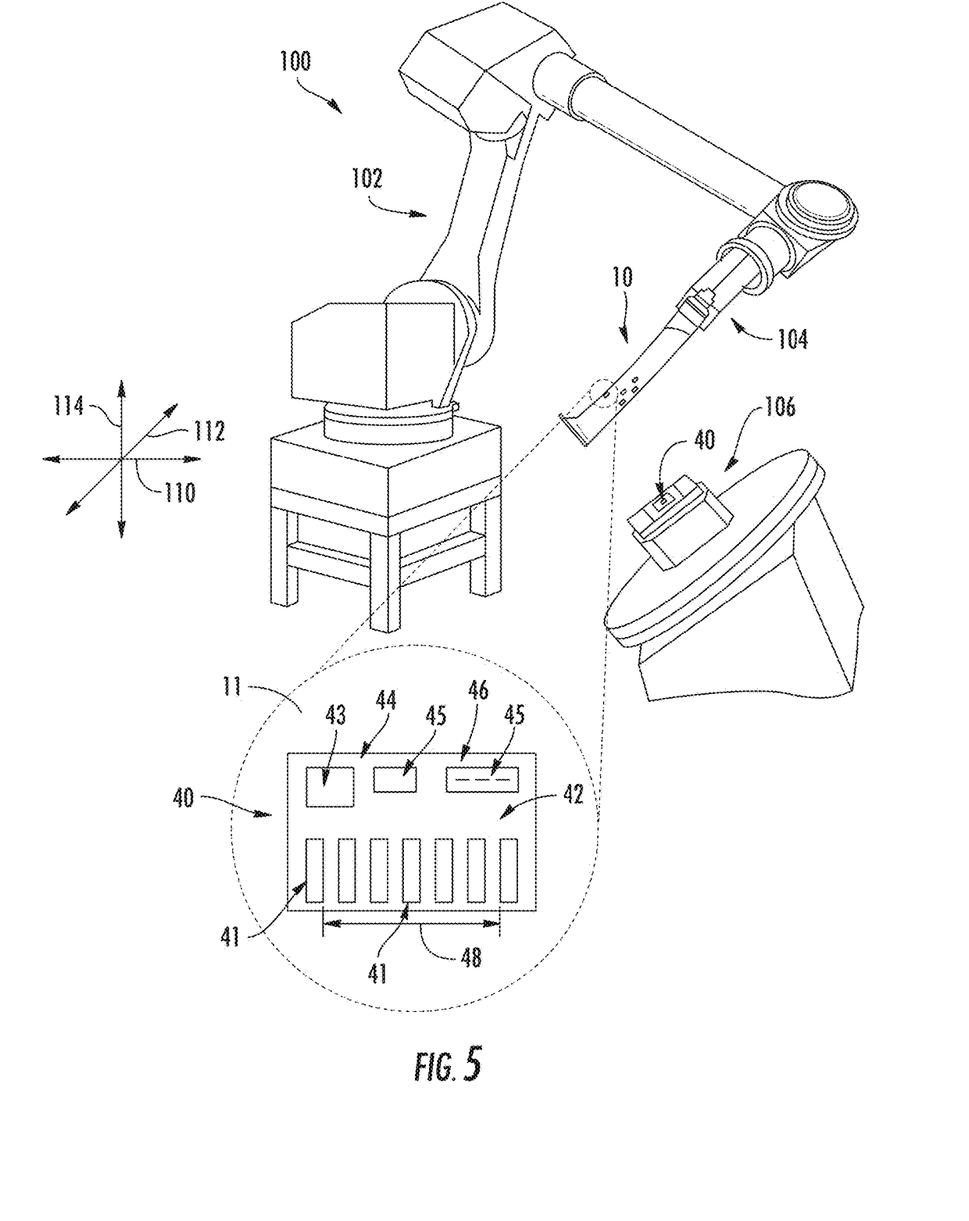
FIG. 5 illustrates a passive strain indicator application system in accordance with embodiments of the present disclosure.

Referring now to FIG. 5, embodiments of a passive strain indicator application system 100 and components thereof are provided. The passive strain indicator application system 100. In general and as discussed herein, system 100 is configured to apply one or more passive strain indicators 40 to a component 10. The system 100 may include, for example, an applicator which produces passive strain indicators 40 and a component adjustment device which moves the component into position relative to the applicator and causes the component to contact and thus receive passive strain indicators 40 applied thereon by the applicator. For example, in exemplary embodiments as shown, system 100 includes a robotic arm 102. The robotic arm 102 may include a gripper 104 which can grip and hold a component 10 for movement during operation to apply passive strain indicators 40. The gripper 104 and robotic arm 102 may move within a predetermined coordinate system of the system 100. The predetermined coordinate system may include a X-axis 110, a Y-axis 112, and a Z-axis 114 which are mutually orthogonal. The arm 102 may move along and/or about one or more of the axes, and in exemplary embodiments is a six-degree of freedom robotic arm capable of movement along and about all three axes. In exemplary embodiments, system 100 may further include a printer 106 which produces passive strain indicators 40. The robotic arm 102 may move the component 10 as required to position the component 10 such that passive strain indicators 40 provided by the printer 106 are applied (such as via contact by the component 10 with the indicators 40 produced by the printer 106) in precise desired locations and orientations on the component 10. In exemplary embodiments, passive strain indicators 40 are formed from ceramics, although in alternative embodiments other suitable materials may be utilized.

System 100 may further include a display device 120. The display device 120 may include one or more display screens, and can display a user interface and components thereof as discussed herein. Further, system 100 can include one or more input devices 122 that can be used by one or more users to provide input to one or more processors and interact with the system 100. An input device 122 may, for example, include a joystick, multi-way rocker switches, mouse, trackball, keyboard, touch screen, touch pad, data entry keys, a microphone suitable for voice recognition, or any other suitable device. Through use of the input devices 122, the one or more users can interact with the graphic and/or textual data elements provided for display on the screens of the display devices 120.

For instance, one or more user interfaces 124 can be displayed on the one or more display devices 120. In some implementations, one or more of the display devices 120 can be operably coupled with the input devices 122 such that a user can interact with the user interface 124 (e.g., cursor interaction via trackball, mouse, etc.) and the textual and/or graphical elements included in the user interface 124. Additionally, and/or alternatively, the display devices 120 can include a touch display screen that can allow a user to visualize the user interface 124 on the touch display screen and interact with the user interface 124 through the touch display screen.

The one or more display devices 120 can be configured to be in wired and/or wireless communication with a control system 200. For instance, in some implementations, a display device 120 can communicate with the control system 200 via a network. The one or more display devices 120 can be configured to receive a user interaction with the user interface 124 and to provide data indicative of the user interaction to the control system 200. For instance, a user can provide an interaction via an input device 122 or touch screen. One or more of the display devices 120 can send data indicative of the user's interaction with the input device 122 or touch screen to the control system 200. The control system 200 can be configured to receive data indicative of the user's interaction with the input device 122 or touch screen.

In response, the control system 200 can be configured to provide one or more signals (e.g., command signals) to system 100 to take actions as discussed herein. For instance, the control system 200 can be in wired or wireless communication with the system 100. Additionally, and/or alternatively, the control system 200 can be configured to communicate with the system 100 via a network. Control system 200 may, for example, be a component of system 100

In response to receiving the one or more command signals, the system 100 and components thereof can execute a control action to complete at least a portion of an action.

Component 10 is illustrated with passive strain indicators 40 applied on a portion of the exterior surface 11 of the component's body. The component 10 can comprise a variety of specific components such as those utilized in high temperature applications (e.g., components comprising nickel or cobalt based superalloys). In some embodiments, the component 10 may comprise a turbine component, such as an industrial gas turbine or steam turbine component such as a combustion component or hot gas path component. In some embodiments, such as the embodiment illustrated in FIG. 5, the component 10 may comprise a turbine blade, compressor blade, vane, nozzle, shroud, rotor, transition piece or casing. In other embodiments, the component 10 may comprise any other component of a turbine such as any other component for a gas turbine, steam turbine or the like. In other embodiments, the component may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

A strain sensor 40 generally comprises at a plurality of reference features. A reference feature of a strain sensor 40 may, for example, be an analysis feature 41, a locator feature 43, or a serial feature 45. Analysis features 41 may be disposed within an analysis region 42, locator features 43 may be disposed within a locator region 44, and serial features 45 may be disposed within a serial region 46 of the strain sensor 40. Generally, a locator feature 43 is utilized as a reference point for the measurement of distances 48 between the locator feature 43 and various analysis features 41. The measurements may be taken at a plurality of different times, as discussed herein. As should be appreciated to those skilled in the art, these measurements can help determine the amount of strain, strain rate, creep, fatigue, stress, etc. at that region of the component 10. The reference features generally can be disposed at a variety of distances and in a variety of locations depending on the specific component 10 so long as the distances 48 can be measured. Moreover, the reference features may comprise dots, lines, circles, boxes or any other geometrical or non-geometrical shape so long as they are consistently identifiable and may be used to measure distances 48.

The strain sensor 40 may comprise a variety of different configurations and cross-sections such as by incorporating a variety of differently shaped, sized, and positioned reference features. For example, the strain sensor 40 may comprise a variety of different reference features comprising various shapes and sizes. Such embodiments may provide for a greater variety of distance measurements 48. The greater variety may further provide a more robust strain analysis on a particular portion of the component 10 by providing strain measurements across a greater variety of locations.

Furthermore, the dimensions of the passive strain indicator 40 may depend on, for example, the component 10, the location of the passive strain indicator 40, the targeted precision of the measurement, application technique, and optical measurement technique. For example, in some embodiments, the passive strain indicator 40 may comprise a length and width ranging from less than 1 millimeter to greater than 300 millimeters. Moreover, the passive strain indicator 40 may comprise any thickness that is suitable for application and subsequent optical identification without significantly impacting the performance of the underlying component 10. For example, in some embodiments, the passive strain indicator 40 may comprise a thickness of less than from about 0.01 millimeters to greater than 1 millimeter. In some embodiments, the passive strain indicator 40 may have a substantially uniform thickness. Such embodiments may help facilitate more accurate measurements for subsequent strain calculations between the first and second reference features.

As illustrated, reference features may in some embodiments be separated from each other by negative spaces. For example, the strain sensor 40 may comprise at least two applied reference features separated by a negative space (i.e., an area in which the strain sensor (and reference feature thereof) material is not applied). The negative space may comprise, for example, an exposed portion of the exterior surface 11 of the component 10. Alternatively or additionally, the negative space may comprise a subsequently applied contrasting (i.e. visually contrasting, contrasting in the ultraviolet or infrared spectrum, or contrasting in any other suitable range of wavelengths in the electromagnetic spectrum) material that is distinct from the material of the reference features (or vice versa).

As discussed, in some embodiments, a strain sensor 40 may include a serial region 46 which may include a plurality of serial features 45. These features 45 may generally form any type of barcode, label, tag, serial number, pattern or other identifying system that facilitates the identification of that particular strain sensor 40. In some embodiments, the serial region 46 may additionally or alternatively comprise information about the component 10 or the overall assembly that the strain sensor 40 is configured on. The serial region 46 may thereby assist in the identification and tracking of particular strain sensors 40, components 10 or even overall assemblies to help correlate measurements for past, present and future operational tracking.

The passive strain indicator 40 may thereby be configured in one or more of a variety of locations of various components 10. For example, as discussed above, the passive strain indicator 40 may be configured on a bucket, blade, vane, nozzle, shroud, rotor, transition piece or casing. In such embodiments, the passive strain indicator 40 may be configured in one or more locations known to experience various forces during unit operation such as on or proximate airfoils, platforms, tips or any other suitable location. Moreover, the passive strain indicator 40 may be deposited in one or more locations known to experience elevated temperatures. For example the passive strain indicator 40 may be configured on a hot gas path or combustion component 10.

In some embodiments, multiple passive strain indicators 40 may be configured on a single component 10 or on multiple components 10. For example, a plurality of passive strain indicators 40 may be configured on a single component 10 at various locations such that the strain may be determined at a greater number of locations about the individual component 10. Alternatively or additionally, a plurality of like components 10 may each have one or more passive strain indicator 40 configured in standard locations so that the amount of strain experienced by each specific component 10 may be compared to other like components 10. In some embodiments, multiple different components 10 of the same unit may each have one or more passive strain indicators 40 configured thereon so that the amount of strain experienced at different locations within the overall unit may be determined.

It should be understood that the present disclosure is not limited to passive strain indicators as described herein, and rather that any suitable group of nodes or fiducials configured on the exterior surface of a component and which can be utilized for deformation analysis is within the scope and spirit of the present disclosure.

Figure 7:
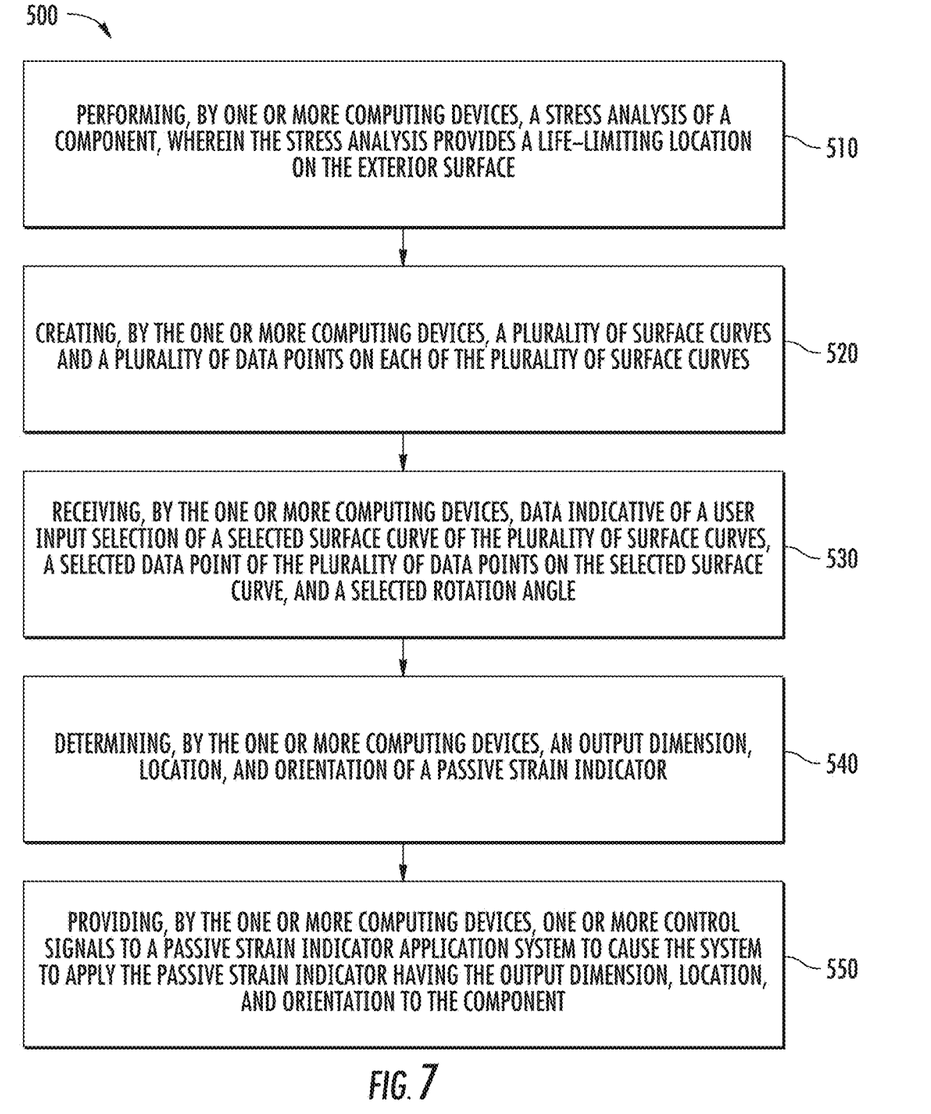
FIG. 7 is a flow chart of a method in accordance with embodiments of the present disclosure.
Figure 8:
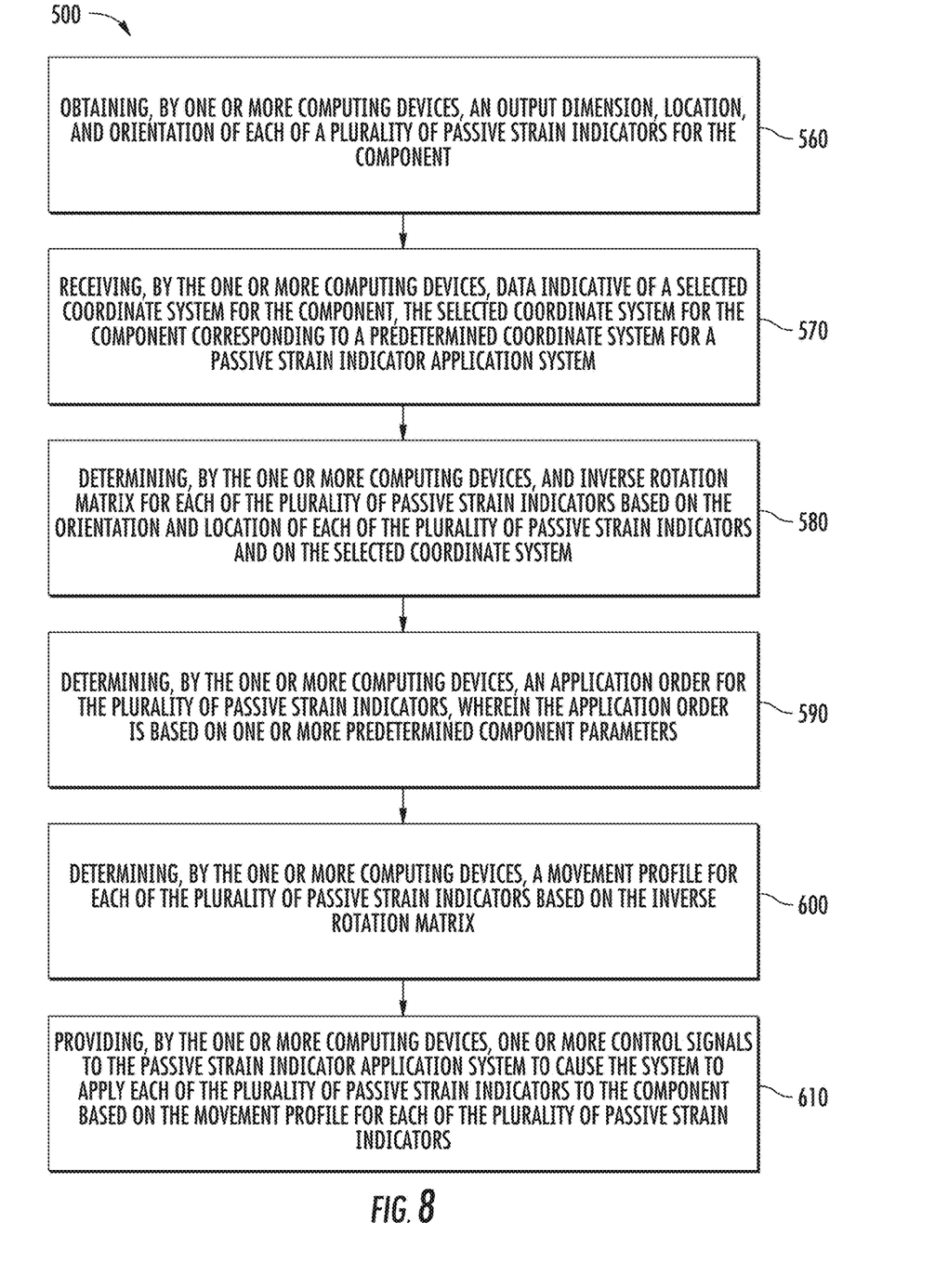
FIG. 8 is a flow chart of a method in accordance with embodiments of the present disclosure.

The present disclosure is further directed to computer-implemented methods 500 for applying passive strain indicators 40 to components 10. FIGS. 7 and 8 depicts flow diagrams of example methods according to example embodiments of the present disclosure. FIGS. 7 and 8 can be implemented by one or more computing devices, such as the control system 200 and system 100 generally. In addition, FIGS. 7 and 8 depict steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

Figure 1:
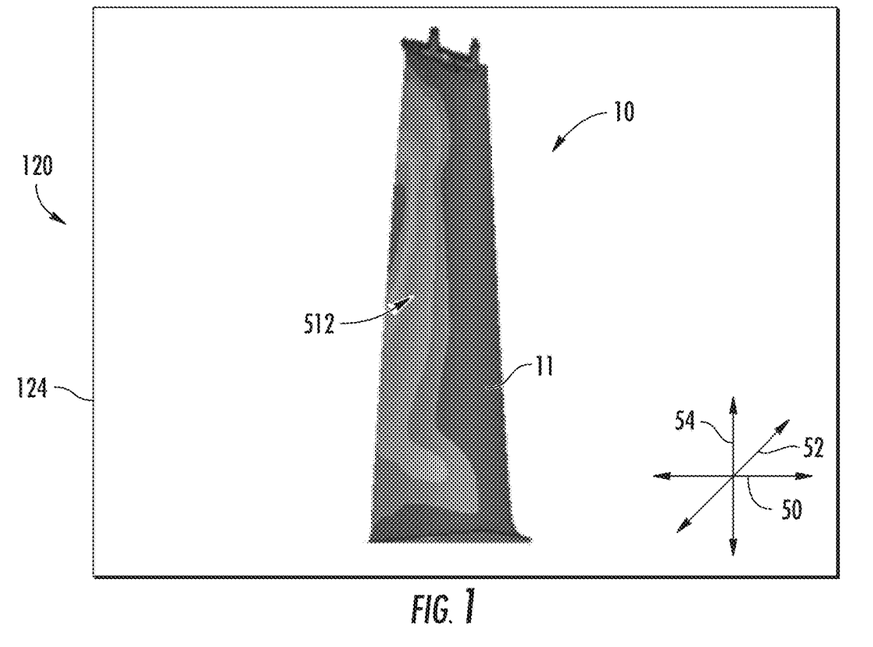
FIG. 1 illustrates an image of a component having had a stress analysis performed thereon in accordance with embodiments of the present disclosure.
Figure 2:
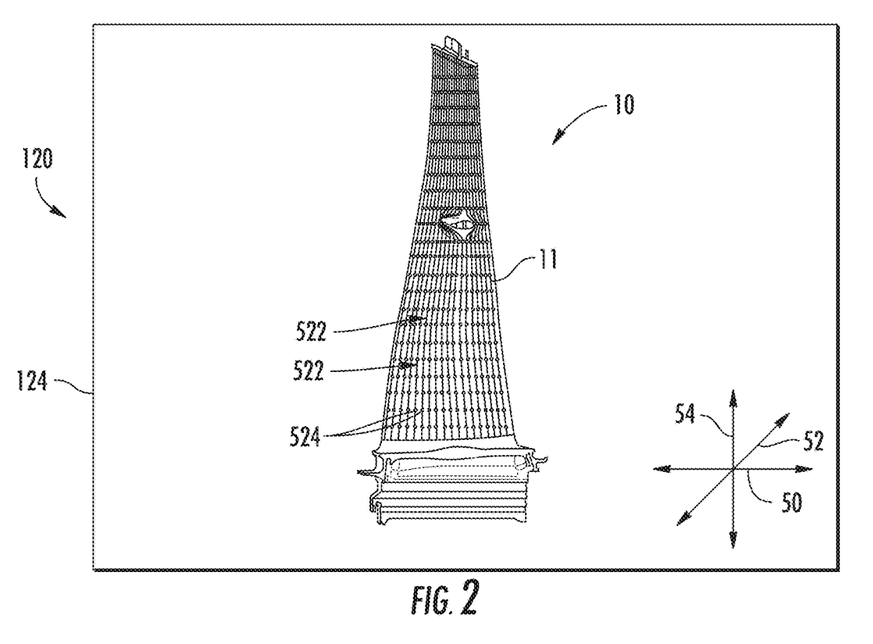
FIG. 2 illustrates an image of a component having had a plurality of surface curves and data points performed thereon in accordance with embodiments of the present disclosure.

Referring now to FIGS. 7 and 8 as well as to FIGS. 1 through 5, a method 500 may, for example, include the step 510 of performing, by the one or more computing devices, a stress analysis of the component 10, wherein the stress analysis provides one or more life-limiting locations 512 on the exterior surface 11 of the component 10. For example, a three-dimensional model of the component 10 may be provided in system 200, and may be displayed on a display device 120 as shown in FIG. 1. A stress analysis may be performed on the model of the component 10, as is generally understood and the results of which are illustrated in FIG. 1. For example, in exemplary embodiments, the stress analysis may be a finite element analysis. Such stress analysis may be performed using, for example, suitable software and user inputs as required and as generally understood, and may be performed by system 200 as is generally understood. Suitable software is available, for example, in CATIA software by Dassault Systemes, in finite element analysis software by ANSYS, in NX software by Siemens, and in other suitable computer aided design software. The resulting life-limiting locations 512 may be locations on the exterior surface 11 of the component 10, as indicated by the model and stress analysis thereof, are more likely to or will fail first during use of the component 10 in service.

Method 500 may further include, for example, the step 520 of creating, by the one or more computing devices, a plurality of surface curves 522 and a plurality of data points 524 on each of the plurality of surface curves 522. Such surface curves 522 and data points 524 are illustrated, for example, in FIG. 2. The surface curves 522 and data points 524 may correspond to and define the exterior surface 11 of the component 10. For example, suitable software and user inputs may be utilized to generate surface curves 522 and associated data points 524 which correspond to and define the exterior surface of the three-dimensional model of the component 10. Such surface curves 522 and data points 524 may correspond to and define the entire exterior surface or a portion thereof. For example, such surface curves 522 and data points 524 may at least correspond to and define the portion(s) of the exterior surface that include life-limiting locations 512. Suitable software for generating such surface curves 522 and data points 524 is available, for example, in CATIA software by Dassault Systemes, in finite element analysis software by ANSYS, in NX software by Siemens, and in other suitable computer aided design software.

Figure 3:
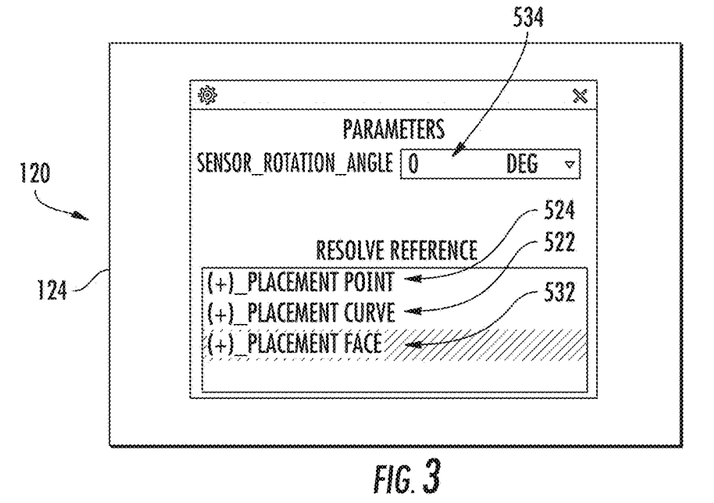
FIG. 3 illustrates a user interface requiring various user input selections in accordance with embodiments of the present disclosure.

Method 500 may further include, for example, the step 530 of receiving, by the one or more computing devices, data indicative of a user input selection of a selected surface curve 522 of the plurality of surface curves 522. Step 530 may further include receiving, by the one or more computing devices, data indicative of a user input selection of a selected data point 524 of the plurality of data points 524 on the selected surface curve 522. Step 530 may further include receiving, by the one or more computing devices, data indicative of a user input selection of a selected component face 532. Step 530 may further include receiving, by the one or more computing devices, data indicative of a user input selection of a selected rotation angle 534. For example, a user may, after step 520 is performed, provide input selections of such various input parameters. Such selections may be performed via one or more input devices 122 and user interfaces 124. For example, FIG. 3 illustrates a user interface 124 which allows user input of such selected surface curve 522, selected data point 524, selected component face 532, and/or selected rotation angle 534. The user may, for example, use input device(s) 122 to selected a surface curve 522, data point 524 on that surface curve 522, and/or face 532 of the component on which the surface curve 522 lies, and/or enter a desired rotation angle 534.

Such input characteristics may be inputs for the location, orientation, and shape of a passive strain indicator 40. For example, the passive strain indicator 40 may, due to such user selections, be located with a centerpoint on the data point 524. Selection of the curve 522 and/or face 532 may, in addition to facilitating selection of the datapoint 524, provide input data regarding the curvature of the exterior surface 11 which may be relevant to the resulting orientation and shape of a passive strain indicator 40 to be so located. The desired rotation angle 534 may be an input regarding the desired orientation of the passive strain indicator 40 relative to the component 10, and may for example be defined relative to Z-axis 54 of the component 10 or relative to a nearest free edge of the component 10.

In exemplary embodiments, the selected surface curve 522 may extend through a life-limiting location 512. Further, in exemplary embodiments, a selected data point 524 may be located within such life-limiting location 512.

Figure 4:
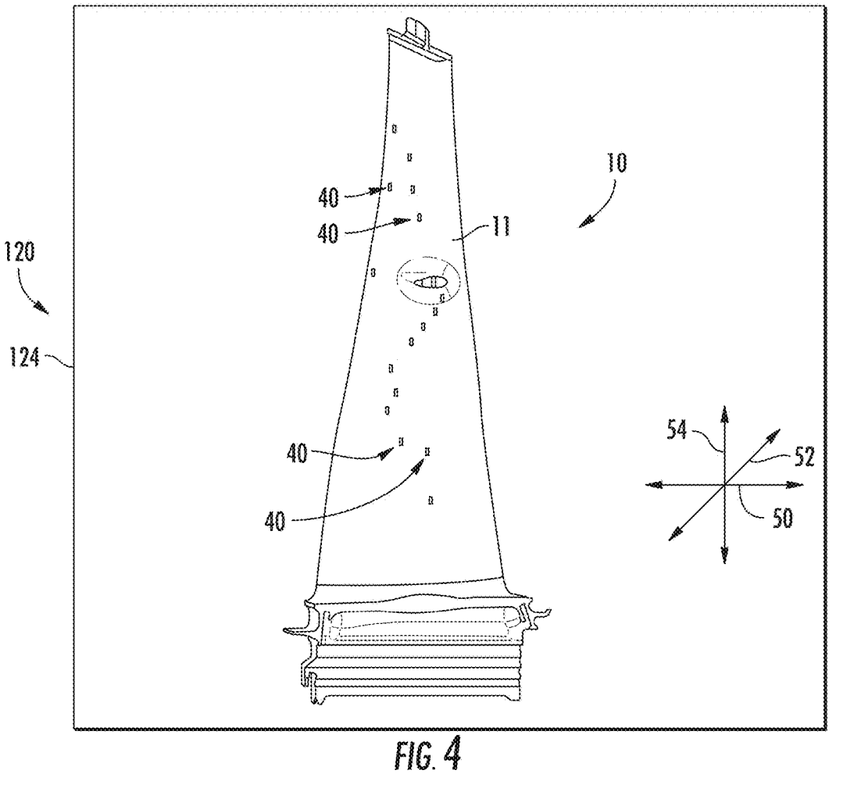
FIG. 4 illustrates an image of a component with a plurality of passive strain indicators applied thereon in accordance with embodiments of the present disclosure.

Method 500 may further include, for example, the step 540 of determining, by the one or more computing devices, an output dimension, location, and orientation of a passive strain indicator 40. FIG. 4 illustrates an image of a plurality of output passive strain indicators 40 located on and relative to a component 10, each having an output dimension, location, and orientation. Such step 540 may be performed in response to the selected surface curve 522, selected data point 524, selected component face 532, and selected rotation angle 534, as discussed herein. Such step 540 may further be performed in response to one or more predetermined passive strain indicator characteristics, which as stated may be predetermined characteristics for the passive strain indicators 40 which are produced in accordance with the present disclosure. Such predetermined characteristics may include shapes, numbers, and relative locational relationships of various reference features of the passive strain indicators 40, as discussed above. Such predetermined characteristics may further include size and shape limits for the passive strain indicators.

The output dimension, location, and orientation of a passive strain indicator 40 may be determined in response to such inputs as discussed herein. The output dimension may include the outermost boundary dimensions of the passive strain indicator 40, as well as various required internal dimensions such as between various reference features thereof. Such output dimension may be sized for the desired location and orientation of the passive strain indicator 40. The location and orientation may be based on the inputs as discussed herein, and may be output relative to an X-axis 50, a Y-axis 52, and a Z-axis 54, which are mutually orthogonal, of the component 10 and three-dimensional model thereof. In exemplary embodiments, the passive strain indicator 40 may be located within a life-limiting location 512.

For example, determination of such outputs may be based at least in part on the results of the stress analysis as discussed herein and the profile of the component 10, and may base the output dimension, location, and orientation on the life-limiting locations 512. More specifically, the life-limiting locations and stress values thereof may, in some embodiments and along with predetermined characteristics as discussed herein, govern the output dimension, location, and orientation such that each passive strain indicator 40, when applied having that output dimension, location, and orientation, is properly positioned within such life-limiting location to provide suitable analysis of such location.

Method 500 may further include, for example, the step 550 of providing, by the one or more computing devices, one or more control signals to the passive strain indicator application system 100 to cause the system 100 to apply the passive strain indicator 40 having the output dimension, location, and orientation to the component 10. For example, control signals corresponding to the output dimension, location, and orientation of the passive strain indicator 40 may be provided to the system 100. The system 100 may cause application of the passive strain indicator 40 having this output dimension, location, and orientation on the exterior surface 11 of the component 10. In exemplary embodiments, for example, the robotic arm 102 may move the component 10 into a suitable position such that the passive strain indicator 40 produced by the printer 106 is correctly located and oriented. The printer 106 may produce the passive strain indicator 40 having the required output dimension, and interaction of the robotic arm 102 and component 10 with the printer 106 and passive strain indicator 40 may cause application (such as via an adhesive, other suitable surface adhesion, or other suitable connection method) of the passive strain indicator 40 on the component 10.

It should be noted that any of step 510-550 may be performed in any suitable order to generate one or more passive strain indicators 40 and apply such passive strain indicators 40 on a component 10. In exemplary embodiments, a plurality of passive strain indicators 40 are determined and applied in accordance with the present disclosure.

Method 500 may further include various steps which facilitate the application of each passive strain indicator 40 to a component 10. Such steps may, for example, be sub-steps of method step 550 as discussed herein.

For example, method 500 may further include the step 560 of obtaining, by the one or more computing devices, an output dimension, location, and orientation of each of a plurality of passive strain indicators 40 for the component 10. Such step 560 may, for example, be performed via one or more of steps 510-540 as discussed herein.

Method 500 may further include, for example, the step 570 of receiving, by the one or more computing devices, data indicative of a selected coordinate system for the component 10. The selected coordinate system for the component 10 may correspond to a predetermined coordinate system for the passive strain indicator application system 100, such as the coordinate system which includes X-axis 110, Y-axis 112, and Z-axis 114. In other words, a user may provide inputs to define the coordinate system for system 100. Such selections may be performed via one or more input devices 122 and user interfaces 124. Such input may allow for coordination between the predetermined coordinate system of the system 100 and the coordinate system of the component 10 which includes X-axis 50, Y-axis 52, and Z-axis 54. This allows data relative to the component 10 coordinate system, as discussed herein, to be adjusted to correspond to the predetermined coordinate system for system 100 such that the application of the passive strain indicators 40 is performed accurately based on these coordinate systems.

Method 500 may further include, for example, the step 580 of determining, by the one or more computing devices, an inverse rotation matrix for each of the plurality of passive strain indicators 40. Such determination may be based on the orientation and location of each of the plurality of passive strain indicators 40, as discussed herein, and may further be based on the selected coordinate system as discussed herein. More specifically, each passive strain indicator 40, such as the location and orientation thereof, may be defined in space by three-dimensional data. This data may further be adjusted based on the selected coordinate system to correspond to such coordinate system. The inverse rotation matrix of the data for each passive stain indicator 40 may then be determined, such as via calculations by system 200. As is generally understood, the inverse rotation matrix is the inverse of the rotation matrix, which is generally a matrix utilized to perform a rotation in three-dimensional space. Such determination for each passive strain indicator 40 may facilitate operation of the system 10 to cause application of the passive strain indicators 40 to the component 10.

Method 500 may further include, for example, the step 590 of determining, by the one or more computing devices, an application order for the plurality of passive strain indicators 40. The application order for the plurality of passive strain indicators 40 is the order in which the passive strain indicators 40 are applied to the component 10. The application order may be based on one or more predetermined component parameters. Such parameters may be rules which define the order in which passive strain indicators 40 are generally applied to the component, and such parameters may thus be utilized to define the order for the passive strain indicators 40. For example, a predetermined component parameter may be a lengthwise rule, which may be a root-to-tip (or vice versa) rule in the case of a component 10 that includes an airfoil. Such rule may require that the passive strain indicators 40 are applied in an order that starts with the indicator 40 closest to an end (such as the root or tip) and progresses lengthwise towards an opposite end (such as the tip or root). An additional or alternative predetermined component parameter may be a widthwise rule, which may be a suction side-to-pressure side (or vice versa) rule or a leading edge-to-trailing edge (or vice versa) rule in the case of a component 10 that includes an airfoil. Such rule may require that the passive strain indicators 40 are applied in an order that starts with the indicator 40 closest to a side (such as the pressure side, suction side, leading edge, or trailing edge) and progresses widthwise towards an opposite side (such as the pressure side, suction side, leading edge, or trailing edge). In some embodiments, a user may select one or more predetermined component parameters for use in determining the application order. For example, a user may provide input selections via one or more input devices 122 and user interfaces 124, and data may be received by system 200 which is indicative of such selections.

Method 500 may further include, for example, the step 600 of determining, by the one or more computing devices, a movement profile for each of the plurality of passive strain indicators 40. Such movement profile may be based on the inverse rotation matrix, and may further be based on the application order. The movement profile for a passive strain indicator 40 is a required movement of the system 100 (such as the arm 102 thereof) to properly place the component 10 for precise and accurate application of that passive strain indicator 40 on the component 10. The movement profile may include movement components along or about one or more axes 110, 112, 114 of the system 100, and may define relative movements (i.e. from indicator application to indicator application) or movements from a standard origination location. In exemplary embodiments, the movement profile for each passive strain indicator 40 includes an X-axis 110 movement component, a Y-axis 112 movement component, a Z-axis 114 movement component, a yaw movement (about the Z-axis 114) component, a pitch movement (about the Y-axis 112) component, and a roll movement (about the X-axis 110) component. Notably, any one or more of these components may be zero, as required for movement to the location and orientation of a particular passive strain indicator 40.

Method 500 may further include, for example, the step 610 of providing, by the one or more computing devices, one or more control signals to the passive strain indicator application system 100 to cause the system to apply each of the plurality of passive strain indicators 40 to the component 10 based on the movement profile for each of the plurality of passive strain indicators 40. Such step and the resulting operation may result in the application of passive strain indicators 50 have the desired output dimension, location, and orientation as discussed herein to a component 10. In exemplary embodiments, for example, the robotic arm 102 may move the component 10 into suitable positions, based on the movement profiles and in the application order, such that the passive strain indicators 40 produced by the printer 106 are correctly located and oriented. The printer 106 may produce the passive strain indicators 40 having the required output dimensions, and interaction of the robotic arm 102 and component 10 with the printer 106 and passive strain indicators 40 may cause application (such as via an adhesive, other suitable surface adhesion, or other suitable connection method) of the passive strain indicators 40 on the component 10.

Figure 6:
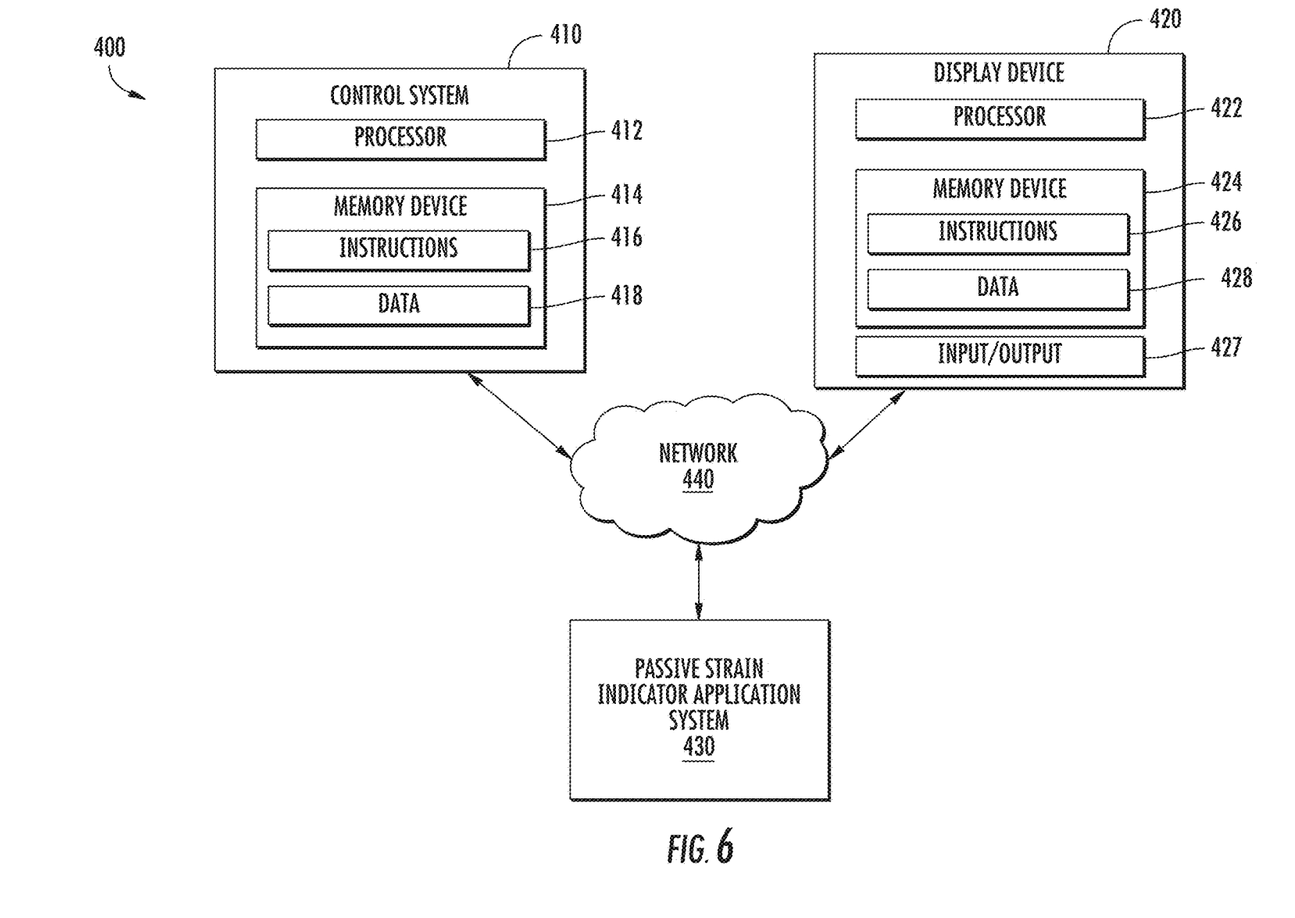
FIG. 6 is schematic illustration of a system in accordance with embodiments of the present disclosure.

FIG. 6 depicts an example system 400 according to example embodiments of the present disclosure. As shown, the system 400 can include a control system 410 and one or more display devices 420, and can further include a system 430. The control system 410 can correspond to the control system 200 as described in example embodiments of the present disclosure. The one or more display devices 420 can correspond to the one or more display devices 120 as described in example embodiments of the present disclosure. The system 430 can correspond to system 100 as described in example embodiments of the present disclosure.

The control system 410 can include one or more processors 412 and one or more memory devices 414. The control system 410 can also include a network interface used to communicate with the display device 420 and/or the system 430 over a network 440. The network interface can include any suitable components for interfacing with one more networks, including for example, transmitters, receivers, ports, controllers, antennas, or other suitable components. The network 440 can include a data bus or a combination of wired and/or wireless communication links. The network 440 can be any type of communications network, such as a local area network (e.g. intranet), wide area network (e.g. Internet), cellular network, or some combination thereof.

The one or more processors 412 can include any suitable processing device, such as a microprocessor, microcontroller, integrated circuit, logic device, or other suitable processing device. The one or more memory devices 414 can include one or more computer-readable media, including, but not limited to, non-transitory computer-readable media, RAM, ROM, hard drives, flash drives, or other memory devices. The one or more memory devices 414 can store information accessible by the one or more processors 412, including computer-readable instructions 416 that can be executed by the one or more processors 412. The instructions 416 can be any set of instructions that when executed by the one or more processors 412, cause the one or more processors 412 to perform operations.

As shown in FIG. 6, the one or more memory devices 414 can also store data 418 that can be retrieved, manipulated, created, or stored by the one or more processors 412. The data 418 can be stored in one or more databases. The one or more databases can be connected to the control system 410 by a high bandwidth LAN or WAN, or can also be connected to the control system 410 through network 440. The one or more databases can be split up so that they are located in multiple locales.

The display device 420 can include one or more processors 422 and one or more memory devices 424. The display device 420 can also include a network interface used to communicate with the control system 410 and/or the system 100 over a network 440. The network interface can include any suitable components for interfacing with one more networks, including for example, transmitters, receivers, ports, controllers, antennas, or other suitable components.

The one or more processors 422 can include any suitable processing device, such as a microprocessor, microcontroller, integrated circuit, logic device, or other suitable processing device. The one or more memory devices 424 can include one or more computer-readable media, including, but not limited to, non-transitory computer-readable media, RAM, ROM, hard drives, flash drives, or other memory devices. The one or more memory devices 424 can store information accessible by the one or more processors 422, including computer-readable instructions 426 that can be executed by the one or more processors 422. The instructions 426 can be any set of instructions that when executed by the one or more processors 422, cause the one or more processors 422 to perform operations. The instructions 426 can be executed by the one or more processors 422 to display, for instance, a user interface on an input/output device 427. The instructions 426 and/or other programs executed by the one or more processors 422 can allow a user to perform functions on a screen surface such as providing user interactions (e.g., touch, cursor) with virtual elements and inputting commands and other data through the screen surface.

The one or more memory devices 424 can also store data 428 that can be retrieved, manipulated, created, or stored by the one or more processors 422. The data 428 can be stored in one or more databases. The one or more databases can be connected to the display device 420 by a high bandwidth LAN or WAN, or can also be connected to the display device 420 through the network 440. The one or more databases can be split up so that they are located in multiple locales.

The display device 420 can include an input/output device 427. The input/output device 427 can include a touch screen surface. Such touch screen surface can include any suitable form including that of a liquid crystal display (LCD) and can use various physical or electrical attributes to sense inputs and interactions from a user. The input/output device 427 can also include a trackball, mouse, other cursor device, touch pad, data entry keys, a microphone suitable for voice recognition, and/or other suitable input devices. The input/output 427 can also include other suitable output devices, such as other audio or visual outputs suitable for indicating the elements of a user interface.

The technology discussed herein makes reference to computer-based systems, as well as, actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for applying passive strain indicators to a component, the component comprising an exterior surface, the method comprising:
   creating, by one or more computing devices, a plurality of surface curves and a plurality of data points on each of the plurality of surface curves, the plurality of surface curves and the plurality of data points defining the exterior surface of the component;
   receiving, by the one or more computing devices, data indicative of a user input selection of a selected surface curve of the plurality of surface curves, a selected data point of the plurality of data points on the selected surface curve, and a selected rotation angle;
   determining, by the one or more computing devices and in response to the selected surface curve, selected data point, and selected rotation angle, an output dimension, location, and orientation of a passive strain indicator; and
   providing, by the one or more computing devices, one or more control signals to a passive strain indicator application system to cause the system to apply the passive strain indicator having the output dimension, location, and orientation to the component.

2. The method of claim 1, wherein the determining step is further performed in response to one or more predetermined passive strain indicator characteristics.

3. The method of claim 1, further comprising performing, by the one or more computing devices, a stress analysis of the component, wherein the stress analysis provides a life-limiting location on the exterior surface.

4. The method of claim 3, wherein the passive strain indicator is located within the life-limiting location.

5. The method of claim 3, wherein the selected surface curve extends through the life-limiting location and the selected data point is located within the life-limiting location.

6. The method of claim 3, wherein the stress analysis is a finite element analysis.

7. The method of claim 1, wherein the passive strain indicator comprises an analysis region, a locator region, and a serial region.

8. The method of claim 1, wherein the component is a turbine component.

9. The method of claim 1, wherein the passive strain indicator is formed from a ceramic.

10. The method of claim 1, wherein the passive strain indicator application system comprises a robotic arm and a printer.

11. A computer-implemented method for applying passive strain indicators to a component, the component comprising an exterior surface, the method comprising:
   performing, by one or more computing devices, a stress analysis of the component, wherein the stress analysis provides a life-limiting location on the exterior surface;
   creating, by the one or more computing devices, a plurality of surface curves and a plurality of data points on each of the plurality of surface curves, the plurality of surface curves and the plurality of data points defining the exterior surface of the component;

receiving, by the one or more computing devices, data indicative of a user input selection of a selected surface curve of the plurality of surface curves, a selected data point of the plurality of data points on the selected surface curve, and a selected rotation angle;

determining, by the one or more computing devices and in response to the selected surface curve, selected data point, and selected rotation angle, an output dimension, location, and orientation of a passive strain indicator, wherein the passive strain indicator is located within the life-limiting location; and providing, by the one or more computing devices, one or more control signals to a passive strain indicator application system to cause the system to apply the passive strain indicator having the output dimension, location, and orientation to the component.

12. The method of claim 11, wherein the determining step is further performed in response to one or more predetermined passive strain indicator characteristics.

13. The method of claim 11, wherein the selected surface curve extends through the life-limiting location and the selected data point is located within the life-limiting location.

14. The method of claim 11, wherein the stress analysis is a finite element analysis.

15. The method of claim 11, wherein the passive strain indicator comprises an analysis region, a locator region, and a serial region.

16. The method of claim 11, wherein the component is a turbine component.

17. The method of claim 11, wherein the passive strain indicator is formed from a ceramic.

18. The method of claim 11, wherein the passive strain indicator application system comprises a robotic arm and a printer.

* * * * *